Patented May 1, 1945

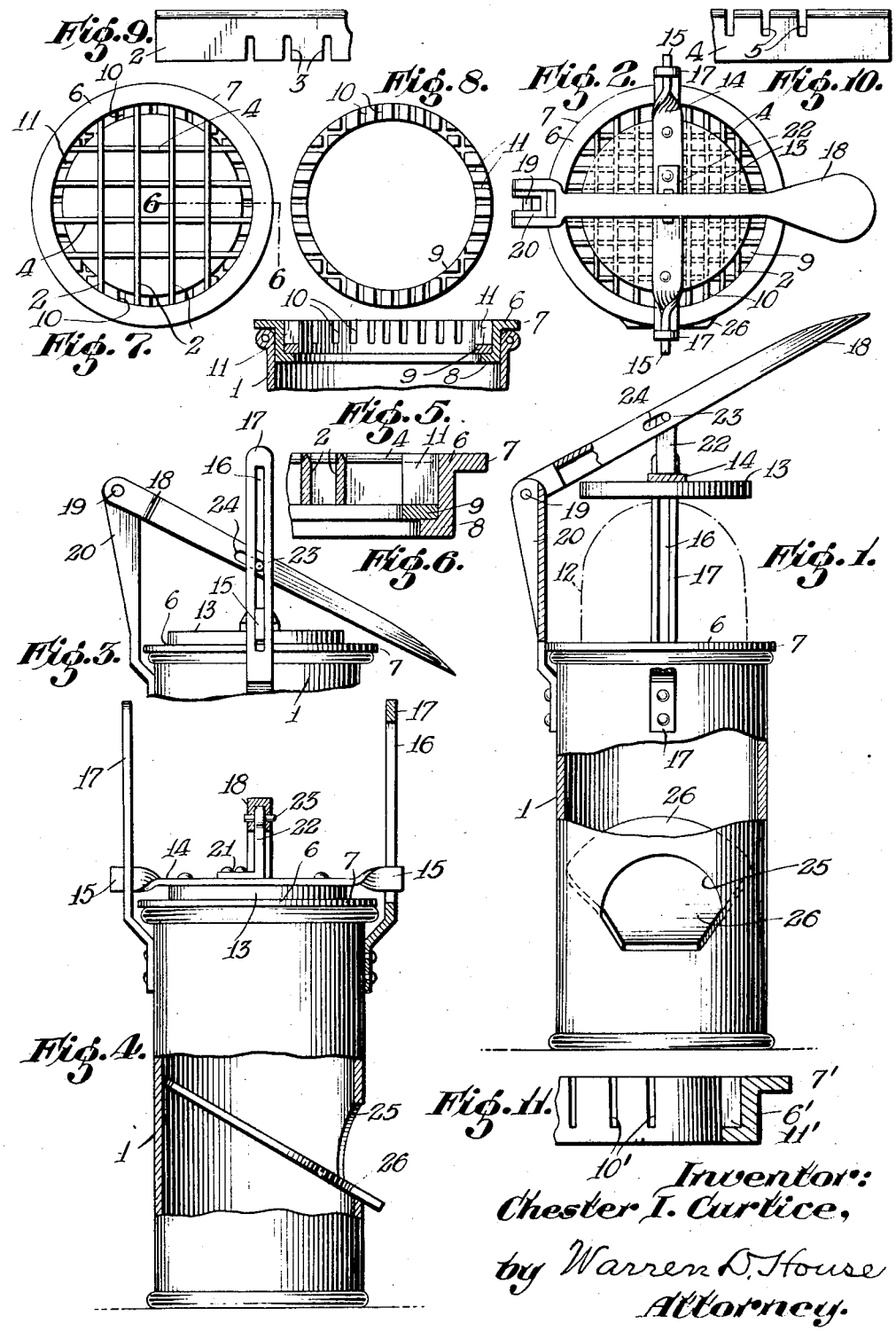

2,374,851

UNITED STATES PATENT OFFICE 2,374,851

VEGETABLE CUTTER

Chester I. Curtice, Kansas City, Mo.

Application May 27, 1943, Serial No. 488,682

1 Claim. (Cl. 146—169)

My invention relates to improvements in vegetable cutters. It relates particularly to the type of vegetable cutters in which horizontal blades disposed edge up are mounted on the open upper end of a tubular support, combined with a presser member adapted to be moved to force a vegetable against and between the blades downwardly into the support.

One of the objects of my invention is the provision of novel means for operatively mounting the cutting blades on the tubular support in a manner such that the blades may be assembled in different numbers and positions, so as to cut the vegetable into different forms and sizes, which enables the parts to be easily and quickly assembled for use; and easily and quickly disassembled for cleaning, and for sharpening of the blades.

A further object of my invention is the provision of novel means for supporting and operating the presser member with ease, and holding it from lateral tipping.

Another object of my invention is the provision of novel means for catching the cut parts of the vegetable discharged into the tubular support, and for discharging them automatically therefrom.

Still another object of my invention is the provision of a novel vegetable cutter of the kind described, which is simple, cheap to make, strong, durable, not likely to get out of order, and which is efficient in its operation.

The novel features of my invention are hereinafter fully described and claimed.

In the accompanying drawing, which illustrates my invention,

Fig. 1 is a view looking at one side of my improved vegetable cutter, shown partly in side elevation, partly in vertical section and partly broken away, the presser member being shown in its uppermost position.

Fig. 2 is a plan view of the vegetable cutter shown in Fig. 1, and embodying one form of my invention in which the blades are mounted in the slots of an inner ring fitted in an outer ring fitted in the upper end of the tubular support. In this view two full sets of crossed blades are shown.

Fig. 3 is a side elevation of an upper portion of the vegetable cutter shown in Fig. 1, the presser member and its operating lever being shown in their lowermost positions.

Fig. 4 is a view looking at another side of the vegetable cutter shown in Fig. 1, the view being partly in side elevation, partly in vertical section and partly broken away, the presser member and its operating lever being shown in their lowermost positions.

Fig. 5 is a central vertical sectional view, slightly enlarged, showing the inner ring mounted in the outer ring, the latter being fitted in the upper end of the upper portion of the tubular support, the blades being omitted.

Fig. 6 is an enlarged vertical sectional view of a portion of the outer ring, a portion of the inner ring mounted therein and portions of some of the blades mounted in the slots of the inner ring, taken on the line 6—6 of Fig. 7.

Fig. 7 is a top plan view of the outer ring, the inner ring mounted therein and some of the two sets of blades mounted in slots in the inner ring, and disposed in numbers and positions adapting them to cut a potato into pieces of forms and sizes adapting them for "French fried" potatoes.

Fig. 8 is a top plan view of the inner ring having blade receiving slots in its upper edge.

Fig. 9 is an enlarged side elevation of an end portion of one of the two sets of blades.

Fig. 10 is an enlarged side elevation of an end portion of one of the other set of blades and having slots in its upper edge adapted to receive the blades which cross it.

Fig. 11 is an enlarged vertical section of a portion of a blade supporting ring having blade receiving slots and adapted to serve the functions of both the inner and outer rings, shown in Figs. 5, 6 and 7, and which is a modification of my invention.

Similar characters of reference designate similar parts in the different views.

I designates a tubular support, preferably a hollow cylinder with an open upper end, as shown.

Two sets of cutting blades are provided. Depending on how the vegetables are to be cut, one set of blades may be used at one time, or both sets may be employed at the same time, arranged as will be hereinafter described.

2 designates the blades of one set arranged, when in use horizontally and parallel with each other, with their cutting edges up and having each in its lower edge vertical slots 3 for receiving respectively the blades 4 of the other set transverse thereto. The blades 4 each has in its upper edge vertical slots 5 which respectively receive the blades 2. The blades 4 are also disposed horizontally edges up and parallel with each other.

For supporting the blades 2 and 4 in the upper end of the tubular support 1, in the form of my invention shown in Figs. 5 and 6, there is provided an outer horizontal ring 6, which is removably fitted in the upper end of the tubular support 1, and is provided with an outer peripheral annular flange 7 which rests on the upper end of the tubular support 1, as shown in Fig. 5.

The ring 6 is provided on its inner side below its top with an inner peripheral flange 8 on which rests an inner ring 9 fitted removably in the ring 6, and having slots in its upper side, arranged in two sets 10 and 11, at right angles to each other for respectively receiving the end portions of the two sets of blades 2 and 4, as is shown in Figs. 2, 6 and 7.

In cutting a vegetable, as a potato, shown in dotted lines in Fig. 1, and designated by 12, the potato rests on the cutting edges of the blades, and a presser member 13, reciprocatively mounted above the blades, is used to force the potato 12 against and downwardly between the blades, which, depending upon their arrangement at the time, cut the potato into pieces of the desired form.

The presser member 13, as shown, comprises a flat horizontal disk, which has fastened upon its upper side a flat bar 14 with projecting end portions 15 disposed edge up and extending respectively through and vertically slidable in two vertical slots 16 provided in two vertical guiding bars 17, fastened, diametrically opposite to each other, at their lower ends to the outer side of and projecting upwardly from the tubular support 1.

For reciprocating vertically the presser member 13, there is provided a lever 18 having one end pivoted by a transverse pin 19 to the upper end of a standard 20, the lower end of which is fastened to the outer side of the tubular support 1. The upper end of the standard 20 is disposed in a vertical plane midway between and at right angles to the vertical plane in which are disposed the guiding bars 17.

An angle bar has a horizontal arm 21 fastened to the middle and upper side of the guiding bar 14. The vertical arm 22 of said angle bar has rigidly fitted in its upper end portion a pivot pin 23, disposed parallel with the axis pivot pin 19, and having its ends slidably mounted respectively in two longitudinal slots 24 in the sides of the lever 18, which at this point is U shaped in cross section.

With the employment of the guiding bar 14 and slotted guiding bars 17, the presser member 13 is held from tilting side wise in one direction, and by the employment of the pivot pins 19 and 23, standard 20, lever 18 and angle bar 21—22, the presser member is held from tilting at right angles to the first named direction.

The tubular support 1 has spaced from its lower end a substantial distance, a side opening 25 through which at its lower end projects the lower end of a bottom member 26, which is fitted at its periphery in the tubular member 1 and slants downwardly to and through said opening 25 at an angle such that pieces of vegetables cut by the blades, and falling downwardly therefrom, strike said bottom member and are discharged by gravity through the opening 25, where they may be caught by a suitable receiver, not shown.

In operating the cutter, if it is desired to cut a vegetable into flat thin slices, all of the blades 2 are mounted in the slots 10 in the inner ring 9. If thicker slices are desired, only alternate blades 2 are mounted in the slots 10. The inner ring 9, with the blades 2 therein, is then mounted in the outer ring 6, and the latter is fitted in the upper end of the tubular support 1. The lever 18 is then swung up to lift the presser member 13 to the position shown in Fig. 1. The vegetable, or part thereof to be cut, designated by 12, Fig. 1, is placed on the blades 2, and the lever 18 is then swung downwardly lowering the presser member 13 and causing it to force the vegetable 12 against and between the blades 2, thereby slicing it. Another vegetable is then placed on the blades 2 and the presser member 13 is again swung by the lever 18, thus slicing the second vegetable and causing it to force the first vegetable from between the blades, the slices of which fall on the bottom member 26 from which they pass by gravity out through the opening 25.

If long thin strips are desired to be cut, as "shoestring" potatoes, a long vegetable is used and all of the blades 2 and 4 are mounted in the inner ring 9, which as described before, is placed in the outer ring 6, which is mounted in the tubular support. The presser member 13 is then operated by the lever 18 to force the vegetable against and between the blades 2 and 4.

By substituting slices of vegetables on the blades 2 and 4, the same may be "diced" when forced between the blades by the presser member 13.

If "French fried" type of pieces are desired, alternate ones of the blades 2 and 4 are employed, as shown in Fig. 7.

In the modified form of means for supporting and positioning the blades 2 and 4, shown in Fig. 11, a ring 6' having an outer peripheral flange 7' is fitted in the upper end of the tubular support 1. The ring 6' is thicker than the ring 6, horizontally, and is provided with two sets of slots 10' and 11' at right angles to each other, extending downwardly from the upper side of the ring at its inner side, to near the bottom thereof.

In this form of my invention, the blades 2 and 4 are respectively mounted at their ends in the slots 10' and 11', whereby the ring 6' performs the functions of the inner ring 9 and the outer ring 6 of the other form of my invention. The operation of cutting the vegetables in the form and sizes desired is effected with the ring 6' by the same mode of operation as has been described with reference to the other form of blade supporting means.

In each form of my invention, after the last vegetable has been cut, the last portion cut will have some pieces remaining in between the blades. The blades and their supporting rings 6 and 9, or ring 6', as the case may be, are removed from the support 1, the adhering pieces removed and the parts cleaned.

By having the standard 20 and the handle 18 disposed in a plane between and at right angles to the plane of the slotted guiding bars 17, and the vertical portions 15 of the bar 14 fitted in the slots 16, there is no liability of side cramping when pressure is applied by the presser 13 to the vegetable.

With the employment of a rigid standard 20 to which the handle 18 is pivoted, with the use of the pivot pin 23 in the slot 24 in the handle, lateral bias is avoided when the presser is subjected to a tilting action by the vegetable that is being sliced.

Other modifications of my invention, within the scope of the appended claim, may be made without departing from the spirit of my invention.

What I claim is:

In a vegetable cutter, a tubular stationary support open at the top and having in its wall at one side a vegetable discharge opening, the lower end of which is spaced a substantial distance from the lower end of said support, a bottom member fitted in and fastened at its periphery to the inner wall of said support and inclining downwardly from the side of said support, which is opposite to said opening, to the lower end of and extending through and projecting outwardly from said opening, and means at the upper end of said support for cutting a vegetable and discharging the cut portions downwardly upon said slanting bottom, the slant of which is sufficient for the cut portions to pass by gravity outwardly through said opening.

CHESTER I. CURTICE.